(12) United States Patent
Golkowski et al.

(10) Patent No.: US 11,433,264 B2
(45) Date of Patent: Sep. 6, 2022

(54) ANCHORING DEVICE FOR SHORING WALLS

(71) Applicant: CBR ROCK MASTER SP. Z O.O. SP. K., Cracow (PL)

(72) Inventors: Mariusz Golkowski, Cracow (PL); Tomasz Biela, Kozy (PL)

(73) Assignee: CBR ROCK MASTER SP. Z O.O. SP. K., Cracow (PL)

( * ) Notice: Subject to any disclaimer, the term of this patent is extended or adjusted under 35 U.S.C. 154(b) by 56 days.

(21) Appl. No.: 16/942,597

(22) Filed: Jul. 29, 2020

(65) Prior Publication Data

US 2021/0146171 A1    May 20, 2021

(30) Foreign Application Priority Data

Nov. 18, 2019 (EP) .................................. 19209789

(51) Int. Cl.
  *A62B 35/00*  (2006.01)
  *E04G 21/32*  (2006.01)
  *F16B 45/04*  (2006.01)

(52) U.S. Cl.
  CPC ...... *A62B 35/0068* (2013.01); *E04G 21/3276* (2013.01); *F16B 45/04* (2013.01)

(58) Field of Classification Search
  CPC .. A62B 35/0068; E04G 21/3276; F16B 45/04
  See application file for complete search history.

(56) References Cited

U.S. PATENT DOCUMENTS 4,546,523 A   10/1985  Bailey, Jr.
6,161,264 A   12/2000  Choate 2002/0073520 A1* 6/2002 Hall ..................... F16B 45/04
                                                       24/588.1
2018/0345056 A1* 12/2018 Kekahuna ............ A63B 27/00
2021/0108429 A1* 4/2021 Walsh ................ E04G 21/3223

FOREIGN PATENT DOCUMENTS

CN    104998360 A    10/2015
CN    206434738 U    8/2017
EP    3228361 A1    10/2017

OTHER PUBLICATIONS

Baszczyński K., Karlikowski M., Zrobek Z. Urządzenia kotwiczące w sprzęcie chroniącym przed upadkiem z wysokości. [Anchor devices in equipment preventing falls from a height.] Bezpieczeństwo Pracy—Nauka i Praktyka Dec. 1999, pp. 6-11.

* cited by examiner

*Primary Examiner* — Anita M King
(74) *Attorney, Agent, or Firm* — Craft Chu PLLC; Andrew W. Chu

(57) ABSTRACT

The anchoring device for shuttering walls includes a body containing an arm with a top tab, a fastening part for at least one connector, a moving closing part mounted in the body and pressed to the closed position at rest, and a locking part. The closing part is a sliding part with an indentation on one of its lateral surfaces which is matched with the slider lock in the open position of the device, and with pass-through pockets and a bottom tab, forming, together with the arm and the upper tab of the body, a tong closure assembly. The device has a set of springs, of which one pushing spring is located inside the body directly above the slider lock and is secured from above by a pressure screw. The three compression springs are located inside the body in the pass-through pockets of the slide.

8 Claims, 7 Drawing Sheets

ANCHORING DEVICE FOR SHORING WALLS

CROSS-REFERENCE TO RELATED APPLICATIONS

See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The subject matter of the invention is an anchor device for shoring walls to protect the user against falling.

2. Description of Related Art Including Information Disclosed Under 37 CFR 1.97 and 37 CFR 1.98

Shoring walls are currently one of the main components in all kinds of construction work, especially when it comes to pouring concrete into the walls. The widespread use of these walls and the fact that their structure is similar among the largest manufacturers (e.g. ULMA, PERI, etc.), and above all their robust metal structure, create favourable opportunities for the use of shoring walls as anchoring components for construction workers. Shoring walls can be of various dimensions—side length can vary from several dozen centimetres to several metres. A specially shaped profile forming the reinforcement of the shoring wall structure ensures sufficient strength, mainly in terms of bending.

Work at height involves a serious risk of falling from a height. In order to protect workers from falling from a height, it is necessary to protect them by restricting the available space in which they can move and by providing protection when stopping them from falling, should they fall into a dangerous zone.

Systems for protection against falls from a height consists of three main subsystems, i.e.: the harness (the part of the system coming into direct contact with the body of the user), the connecting or connecting/shock absorbing subsystem and the anchoring device. Anchoring devices make it easier, and often even make it possible to connect the safety system to a fixed structure. In addition, the anchoring devices may act as stand-alone components of equipment preventing falls from a height or as anchoring devices forming part of a connecting or connecting/shock-absorbing system. Certain components of these devices may also be permanently attached to a fixed structure (Baszczyński K., Karlikowski M., Zrobek Z. Urządzenia kotwiczące w sprzęcie chroniqcym przed upadkiem z wysokości. [Anchor devices in equipment preventing falls from a height.] Bezpieczeństwo Pracy—Nauka i Praktyka" December 1999, pp. 6-11).

The state of the art is known for anchor devices of various designs:

From document CN104998360A a complex insulating anchor-type tool for safety harnesses containing a body in the form of a hook is known. A self-clamping mechanism is situated in the opening of the body. The self-clamping mechanism consists of a cylinder located on the body of the hook and the body of the hook has a through-hole for ejecting the sliding rod into the body of the cylinder and the sliding rod is connected to the bottom of the body of the cylinder by means of a spring. One part of the end of the cylinder is fitted with a circular opening through which the string passes and the cylinder is fitted with a pulley.

Document CN206434738 (U) reveals an anchor device, consisting of a hook, characterized in that the bottom of the hook is provided with a fastening rod with an internal chamber. Whereas the inner cavity of the movable slot is connected to the movable shaft and the inner cavity of the movable shaft is connected to a locking lever, one end of which penetrates the right side of the fixing rod and extends to the inner cavity of the hook, while the third spring is located at the connection of one end of the locking rod and the clamping rod. The protective box on the other hand is located on the left side of the fixing rod and the other end of the locking rod extends through the fixing rod and the safety box and extends to the protective box. In addition, the internal cavity of the protective box is provided with a pressure rod and the bottom of the pressure rod is provided with a movable plate with a rotating shaft in the middle of the upper part. Whereas at the connection of the upper part of the rotating shaft and the protective box, the connecting rod is located, and at the right side of the upper part of the moving plate, at the connection of the protective box, there is a second spring. The tappet, in turn, is located on the left-hand side of the lower part of the moving plate and the bottom of the tappet and the locking rod form a permanent connection. Whereas the left side of the bottom of the moving plate is equipped with the first spring and the bottom of the first spring is equipped with a carrier plate whose left side is permanently connected to the protective box. The bottom of the fastening rod is equipped with a fastening ring.

Document EP3228361 (A1) reveals a hook type anchor component, which is equipped with a hook part, a closing body through the hook part so that it can rotate around the first shaft and the first pushing body to push the closing body from the open to the closing position. Whereas, the said closing body shall comprise a primary closing part supported by a hook part; the first part of the arm extending from the base part of the closing body and capable of opening and closing the entry of the hook part; and the second part of the arm extending from the base part of the closing body. The second part of the arm extends in a direction other than the direction in which the first part of the arm extends and includes the operating part of the closing body that is located on the opposite side of the hook part from the entry and moves the closing body from the closed to the open position. The revealed safety hook is also equipped with a locking part to secure the closing body in the closed position. The aforementioned locking part includes the operative part of the locking member to operate the locking member, and the operative part of the locking member allows the locking member to be unlocked from the closing body. Whereas the operating part of the locking member is located on the same side of the hook member as the operating portion of the closing member. The structure of the revealed anchor part is designed to improve handling in gloves by preventing the gloves from jamming in the closing part of the device.

Conversely, U.S. Pat. No. 6,161,264 (A) reveals a safety hook containing: a hook section having a hook body with a pin part, a nose part and an outlet between the shaft and the nose part; a pivotably mounted gate on a part of the shaft of the hook body, where the gate has a closing part and at least one web section along a plane containing a projection that extends from the plane of the web section and towards the hook body; and a locking component having at least one part of the wall with a gap designed to accommodate the projection of the said gate and a peninsular part extending from the said base of the said hook towards the front of the said hook, and the said peninsular part ends in a tip which extends between the said gate and the said locking component so that the movement activating the locking component is separated from the gate. Wherein a part of the wall is mounted pivotably on a part of the body of the hook shaft body and the center of the said gate is mounted on a part of the wall with a locking part, and the said locking part is movable from the first position where the wall part obstructs the movement of the projection on the web part of the gate and from the second position where the slot receives the projection on the web part so that the gate can move to open access to the hook outlet.

U.S. Pat. No. 4,546,523 AA reveals a safety hook design that allows a simple, safe and durable connection between the safety belt/harness and the safety line. Wherein the safety hook consists of a hook body, a closing part mounted pivotably on the body and normally pressed to the closed position, and a latch mounted on the closing part, which is normally pressed to the locked position to prevent the closing part from opening. The safety hook is preferably shaped so that the latch is seated pivotably on the closing part and pressed normally to engage with the locking arm formed on the edge of the body opposite the outlet to prevent the closing part from opening. The hook can therefore be operated with one hand, i.e. by placing it in the palm of the hand, pushing the latch with the thumb to release it from the locking arm and then sliding the latch towards the palm with the thumb to lift the closing part at the same time.

The purpose of the invention is to provide a new, easy-to-use safety device for shuttering walls to prevent the user from falling from a height, containing sliding parts and operated with the thumb of one hand.

BRIEF SUMMARY OF THE INVENTION

The essence of the invention consists of an anchoring device for shuttering walls comprised of a body containing an arm with a top tab, a fastening part for at least one connector, a moving closing part mounted in the body and pressed to the closed position at rest, and a locking part characterized in that the closing part is a sliding part with an indentation on one of its lateral surfaces which is matched with the slider lock in the open position of the device, with pass-through pockets and a bottom tab, forming, together with the arm and the upper tab of the body, a tong closure assembly. The device has a set of springs, of which one pushing spring is located inside the body directly above the slider lock and is secured from above by a pressure screw. The three compression springs, on the other hand, are located inside the body in the pass-through pockets of the slide.

The slider, fastener and slider lock are preferably connected to the body by means of fastening screws, preferably conical fastening screws or rivets.

The fastener is preferably equipped with at least one eye to attach the connecting piece.

The fastener is preferably made of steel sheet, metal sheet, composite sheet or aluminum.

Preferably the top tab of the body arm has a conical ending.

The body of the device is preferably made up of a double-sided side part and a top part.

The body is preferably composed of two side parts and an upper part.

The upper tab is preferably attached to the upper part of the body by means of a fastening pin.

The invention provides the following advantages:
the device can be operated with one thumb of either hand;
the design of the body allows the user to easily grasp the device during operation;
the design of the device eliminates the possibility of gloves being caught when closing and opening;
the movement of the slider lock of the device does not require a lot of force;
placing the device according to the invention on the shoring wall and its removal does not require the user to release the body of the device, which increases the user's safety when working at heights;
the device incorporates a set of springs forming an automatic lock of the device which prevents the uncontrolled opening of the device during use;]
the device according to the invention meets the requirements of the PN-EN795 standard.

BRIEF DESCRIPTION OF THE SEVERAL VIEWS OF THE DRAWINGS

The invention is shown in figures.

DETAILED DESCRIPTION OF THE INVENTION

The invention is presented in the embodiments:

Embodiment 1

Anchoring Device Design

Figure 1:
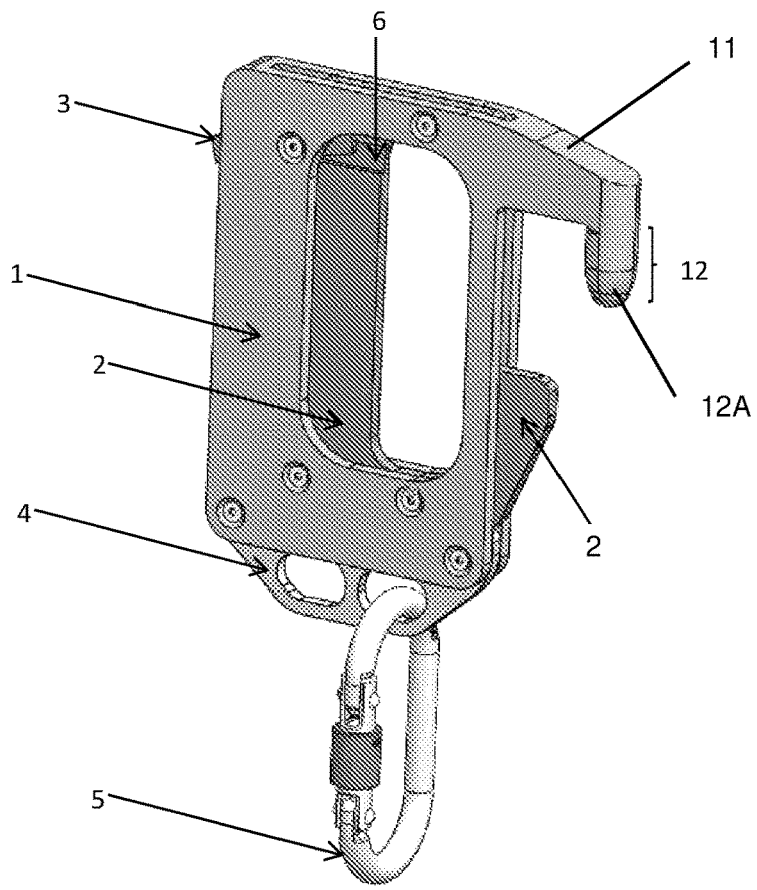
FIG. 1 is a perspective view representing the device according to the invention in an axonometric view.
Figure 2:
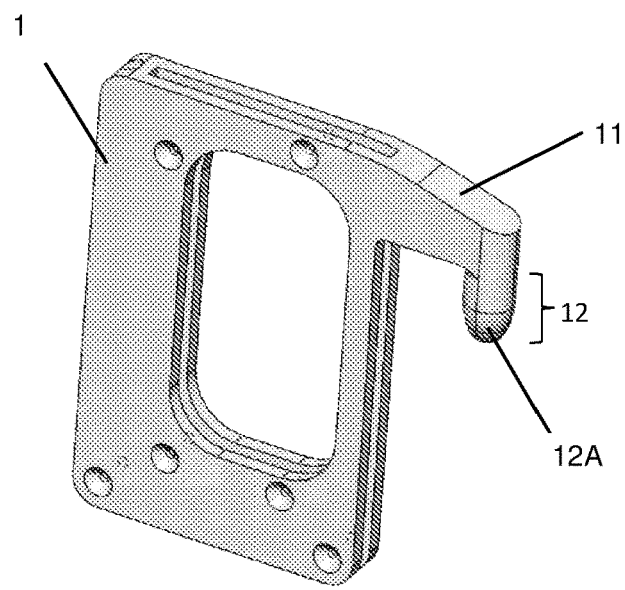
FIG. 2 shows a perspective view of the body of the device according to the invention.
Figure 4:
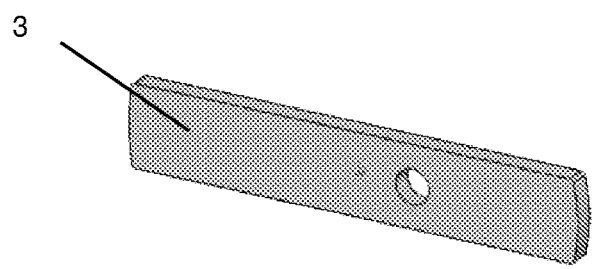
FIG. 4 shows a perspective view of the device slider lock according to the invention.
Figure 5:
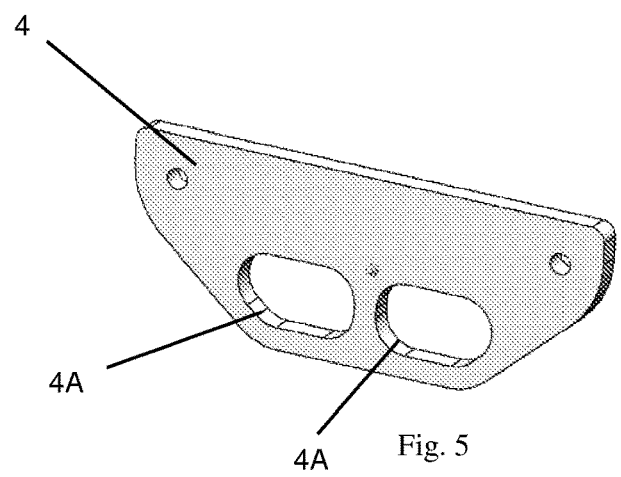
FIG. 5 represents a perspective view of the fixture of the device according to the invention.

The anchoring device according to the invention, intended for shuttering walls is shown in FIG. 1. It contains a body 1 equipped with an arm 11 ended with an upper tab 12 ended with a cone intended for mounting the device in the structural opening of the shuttering wall (FIG. 2), the slider 2 or moving closing part mounted in the body and pressed to the closed position in the rest position (FIG. 3), the slider lock 3 (FIG. 4) and the fastener portion 4, fixing at least one connecting part 5 (FIG. 5). As indicated in FIG. 2, body 1 has a rectangular shape and is equipped with an arm 11 terminated with an upper tab 12 ended with a cone 12A. The body 1 has a through hole for use as a hand grip. Wherein arm 11 of body 1 may be of different lengths depending on the dimensions of the shoring. Similarly, the dimensions (i.e. length and thickness) of the upper tab 12 of the body 1 are adapted to the dimensions of the shoring.

In this embodiment, the fastener portion 4 is a steel fastening plate, but metal sheet, composite sheet, or aluminum can also be used. Whereas a connecting piece 5 is a steel carabiner.

Figure 6A:
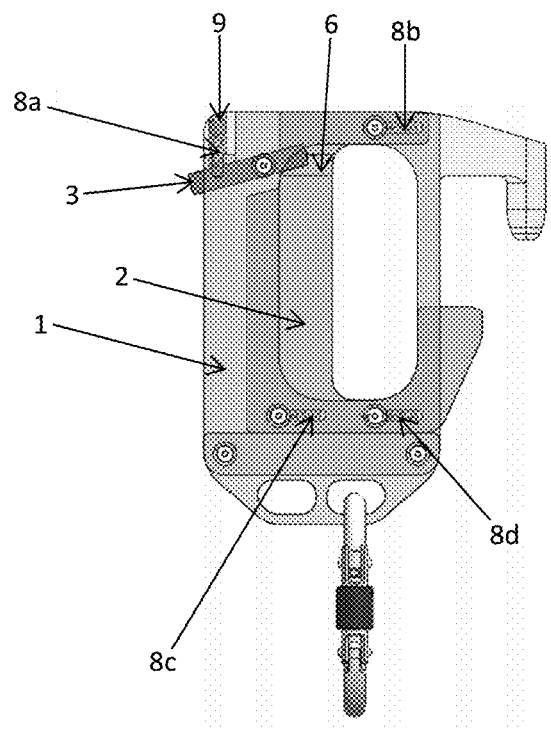
FIG. 6A shows a perspective view of the device according to the invention in the closed/rest position (A).
Figure 6B:
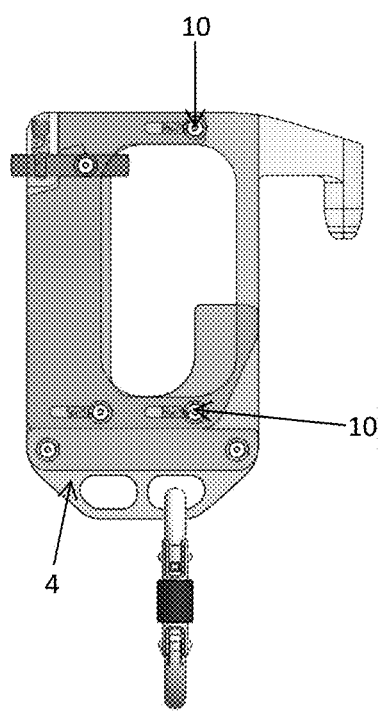
FIG. 6B shows a perspective view of the device according to the invention in the open position (B).

However, in this embodiment, the aforementioned fixing plate of the fastener portion 4 is equipped with two lugs 4A for attaching the connecting piece 5 (FIG. 5, FIG. 6A, FIG. 6B). Wherein, in this embodiment, slider 2, fastener 4 and slider lock 3 are connected to the body 1 by means of conical mounting screws 10. A riveted connection can also be used.

Figure 3:
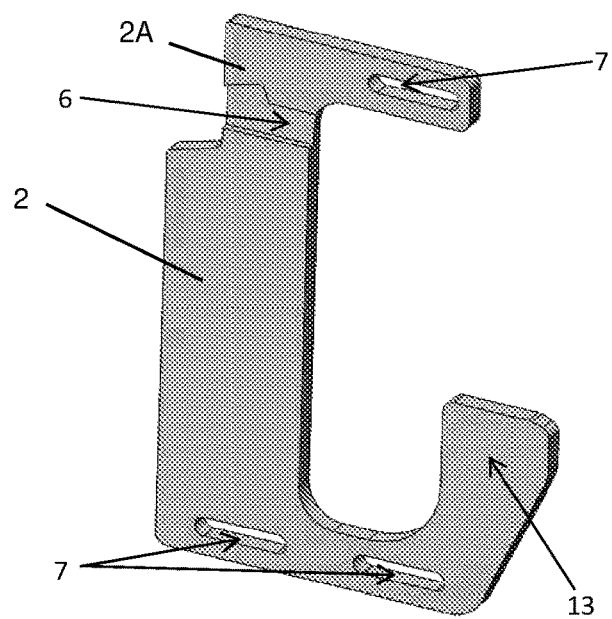
FIG. 3 shows a perspective view of the device slider according to the invention.

The device is characterized in that the closing part is a slider 2 (having a rest position and a closed position) with cutout 6 on one of its lateral surfaces 2A, which matches the slider lock 3 (having a locked position and an open position) in the open position of the device, with through pockets or through slots 7 and a bottom tongue or bottom tab 13. However, the bottom tab 13 of slider 2 forms together with the arm 11 and the upper tab 12 of body 1 a tong closure assembly, in which the upper tab 12 is used to anchor the device in the shuttering opening, and the bottom tab in the closed position of the device is a locking part that jams the device (FIG. 1, FIG. 3, FIG. 6A, FIG. 6B). Moreover, as shown in FIG. 3, slider 2 is C-shaped and its internal curvature matches the shape of the through hole of body 1 designed for the user's grip.

Figure 9:
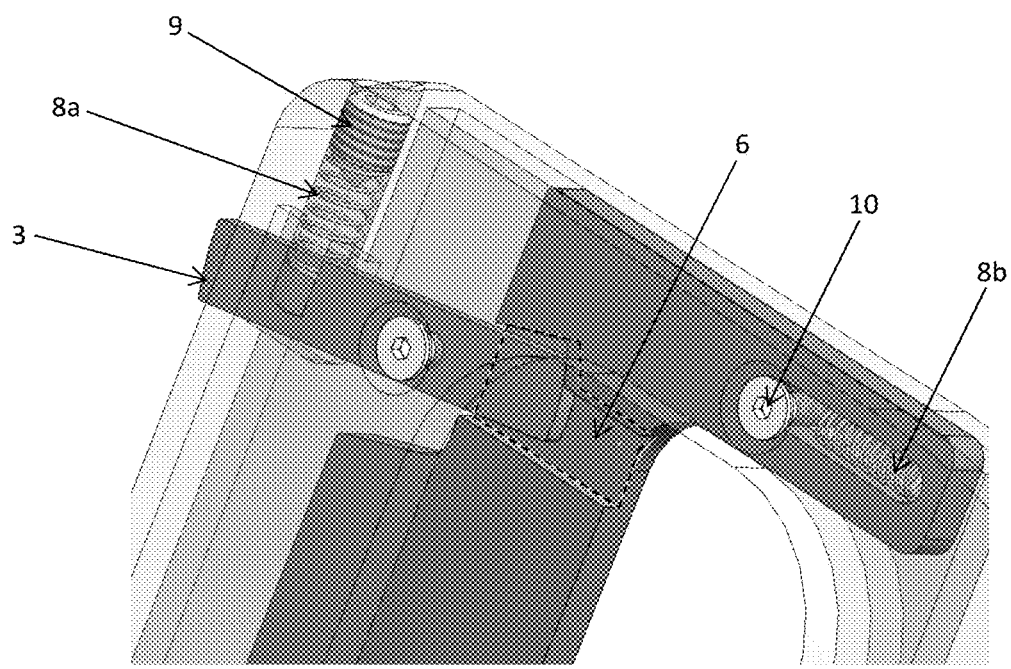
FIG. 9 shows an enlarged perspective view of the slider lock mechanism with a visible cut-out surface on the slider wall marked with a dotted line.

In addition, the device contains a set of springs (pushing spring 8a, compressive springs 8b, 8c, 8d) forming an automatic locking of the device which prevents uncontrolled opening of the device during use. Wherein, one spring 8a, which pushes the slider 2 downwards by default, is located inside the body 1 directly above the slider 2 lock and is secured from above by a grub screw 9 (FIG. 9), which prevents it from falling out. Whereas three compression springs 8b, 8c and 8d are located inside the body 1 in the through pockets or through slots 7 of slider 2 (FIG. 6A, FIG. 6B). The rest position of the slider 2 corresponds to the locked position of the slider lock 3, the pushing spring being extended against the slider lock within the cutout with the slider in the rest position, each compressive spring being extended within the respective through slot with the slider in the rest position. The closed position of the slider 2 corresponds to the open position of the slider lock 3, the pushing spring being compressed by the slider lock so as to extend the slider lock through the cutout with the slider in the closed position, each compressive spring being compressed within the respective through slot with the slider in the rest position. The upper tab 12 of the body and the bottom tab 13 of the slider form a tong closure with the slider in the rest position and the slider lock in the locked position.

Embodiment 2

Figure 12:
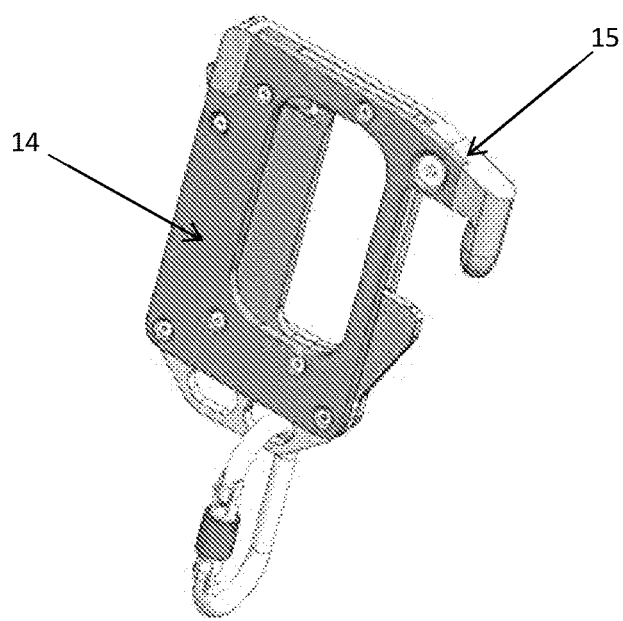
FIG. 12 shows a perspective view of the device according to the invention with a two-part body in an axonometric view.

Anchoring device according to embodiment 1, except that its body 1 is composed of a two-sided side part 14 and an upper part 15 (FIG. 12).

Embodiment 3

Figure 13:
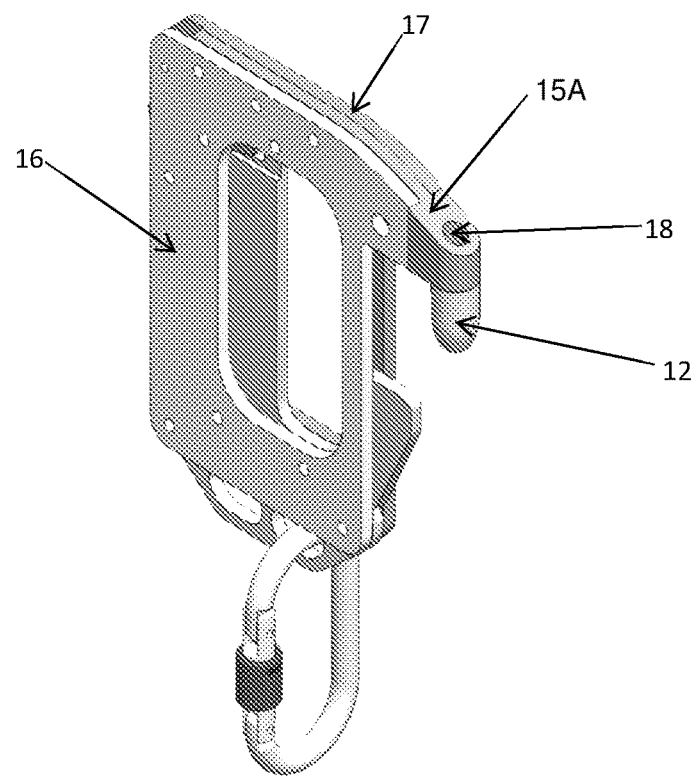
FIG. 13 shows a perspective view of the invention according to the device with a body consisting of two side parts and an upper part in an axonometric view.
Figure 14:
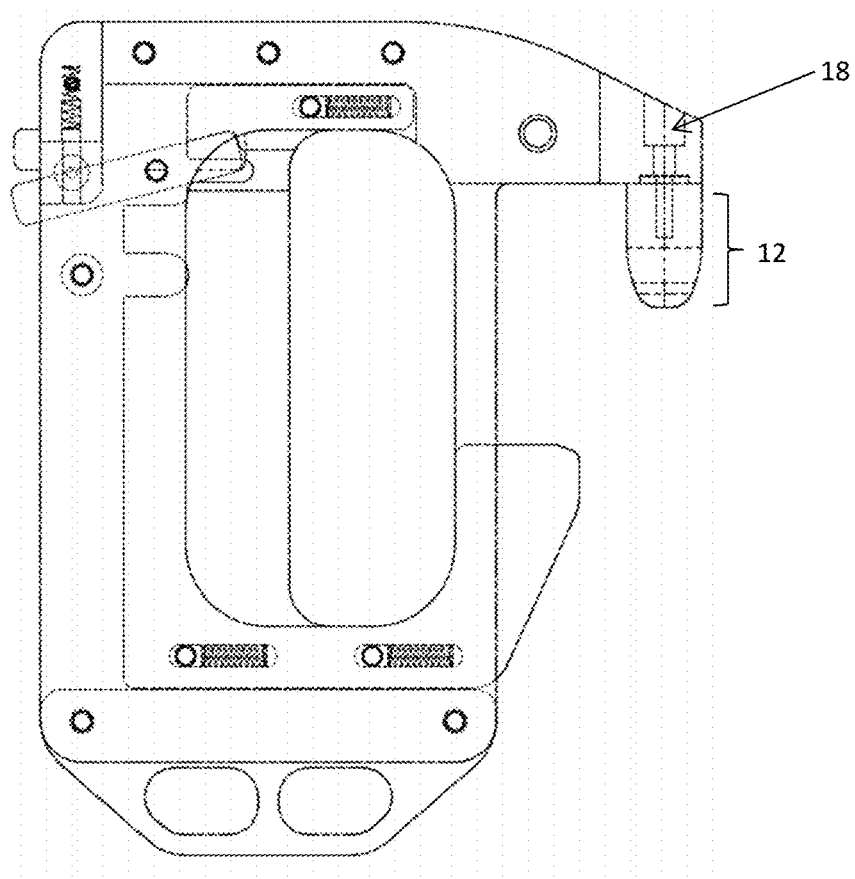
FIG. 14 shows a schematic view of a diagram of the device according to the invention indicating the location of the fastening pin.

Anchoring device according to embodiment 1, except that its body 1 is composed of two side parts 16 and 17 and an upper part 15 (FIG. 13). Wherein, preferably, the upper tab 12 is fixed to the top part 15 of body 1 by means of a fastening bolt 18 (FIG. 14).

Embodiment 4

The mode of operation of the device according to any of the previous embodiments from 1 to 3

Figure 7:
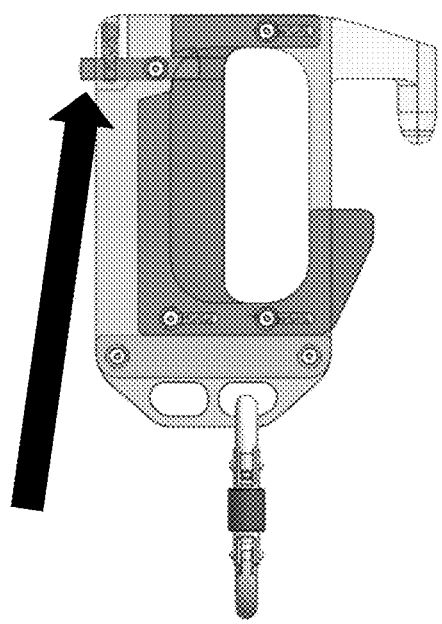
FIG. 7 shows a schematic view of the first stage of opening the device according to the invention, i.e. releasing the lock.
Figure 8:
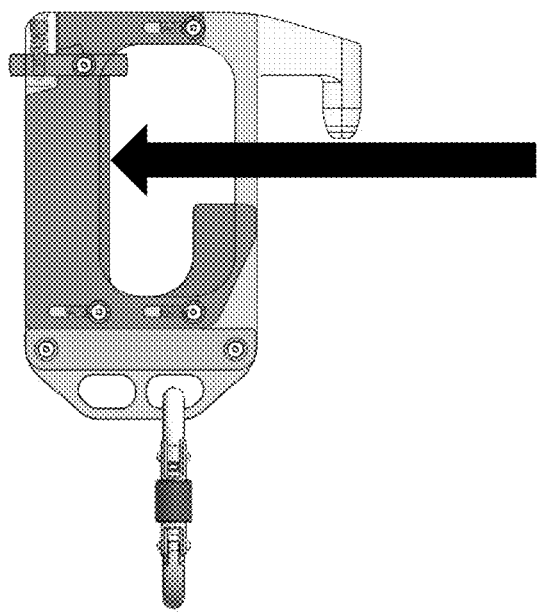
FIG. 8 shows a schematic view of the second stage of opening the device according to the invention, i.e. the shifting of the slider.

If you want to place the device according to the invention on a shuttering wall, you must open its movable slider 2 to the maximum. However, in order to do this, it is necessary to release lock 3 by moving it with the thumb of either hand upwards, overcoming the resistance of spring 8a in body 1, wherein the spring is secured against falling out by means of a grub screw 9. Moving the lock of slider control 3 until its topmost position (slider control lock is in horizontal position) will allow slider control 2, which has a special indentation 6 on one of its side surfaces, to move backwards (i.e. in the direction opposite to the position of the body's arm 11) in a horizontal direction, moving the tongue of the lower 13 slider control 2 away from the tongue of the upper 12 of body 1, resulting in the device taking an open position. FIG. 7 shows the direction of force application (arrow) in order to move the lock 3. However, the movement of lock 3 does not require much force. Whereas FIG. 3 8 shows the direction of force application to move slider 2. Movement of the slider 2 relative the body 1 shown in FIG. 8 enables the device to be mounted in the structural opening of the shuttering wall. Wherein the top tab of body 1 is placed in the opening of the shuttering wall.

Figure 10:
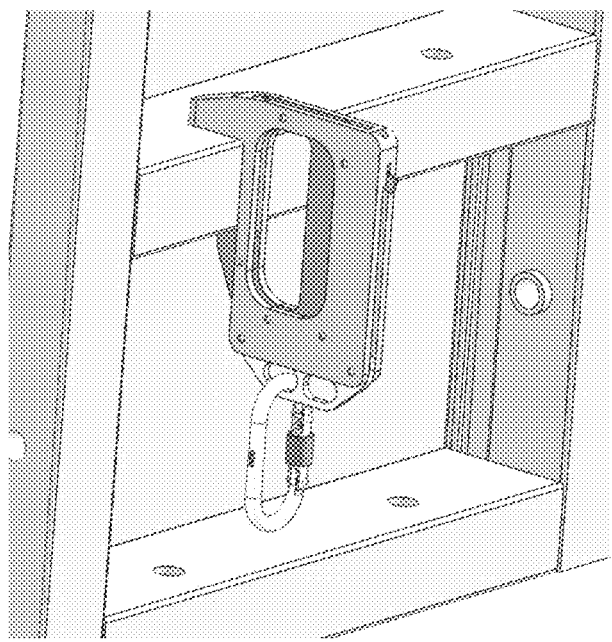
FIG. 10 shows an enlarged perspective view of the device, according to the invention, attached to a shuttering wall.
Figure 11:
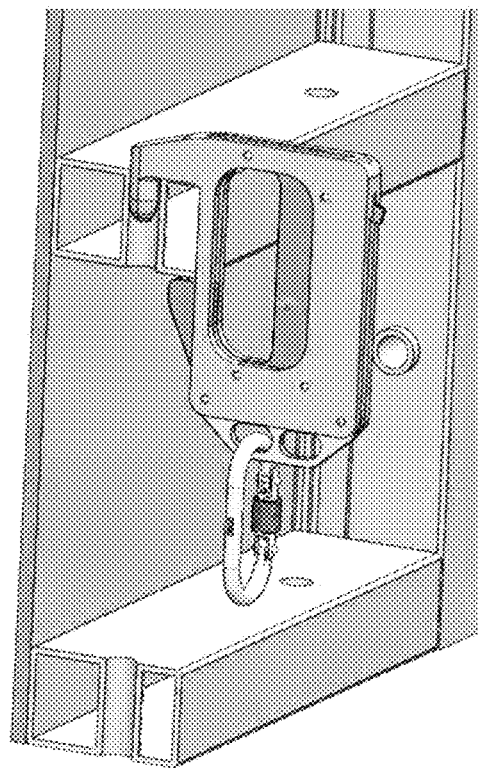
FIG. 11 shows a perspective view of a cross-section through a shuttering wall with the device attached according to the invention.

The automatic lock of the device in the form of a set of springs 8a, 8b, 8c and 8d prevents the device from opening when in use. If no action is taken by the user and the moving parts are in the free space, the device automatically moves to the closed position (as in FIG. 6A). Only when both actions have been performed consciously (raising the lock of the slider 3 and shifting the slider 2 backwards) will it be possible to unlock the device (as in FIG. 6B) and e.g. its insertion/removal from the shuttering wall, as shown in FIG. 10 and FIG. 11.

Embodiment 5

Strength Analysis of the Device

The main strength calculations for sensitive components and anchor device parts according to the invention were carried out using the Finite Element Method (FEM) using SolidWorks Simulation 2018 software.

FEM is an advanced method of solving systems of differential equations, based on the division of a domain (the examined component) into finite elements for which the solution is approximated by specific functions, and performing actual calculations only for the nodes of this division.

The results obtained with the Simulation design analysis software provide an approximation of the stress/strain values, etc. that can be expected during the use of the equipment.

In this embodiment, the FEM simulation was performed under a load of 15 kN, i.e. the value required by the PN-EN795 standard.

The results of the FEM simulation show the correctness of the designed device according to the invention. The device according to the invention meets the PN-EN795 standard.

We claim:

1. An anchoring device for shuttering walls comprising:
   a body being comprised of an arm ending with an upper tab;
   a fastener portion connected to said body so as to removably attach to at least one connecting piece;
   a slider being slidably seated in said body and having a closed position and a rest position relative to said body, said slider being pressed from said rest position to said closed position,
   wherein said slider is comprised of a lateral surface with a cutout, a plurality of through slots, and a bottom tab;
   a slider lock being rotatably mounted in said cutout and having a locked position and an open position;
   a pushing spring being located inside said body directly above said slider lock and being secured from above by a grub screw; and
   a plurality of compressive springs being located inside said body, each compressive spring corresponding to a respective through slot of said plurality of through slots,
   wherein said rest position of said slider corresponds to said locked position of said slider lock, said pushing spring being extended against said slider lock within said cutout with said slider in said rest position, each compressive spring being extended within said respective through slot with said slider in said rest position,
   wherein said closed position of said slider corresponds to said open position of said slider lock, said pushing spring being compressed by said slider lock so as to extend said slider lock through said cutout with said slider in said closed position, each compressive spring being compressed within said respective through slot with said slider in said rest position, and
   wherein said upper tab of said body and said bottom tab of said slider form a tong closure with said slider in said rest position and said slider lock in said locked position.

2. The anchoring device according to claim 1, further comprising:
   a plurality of fixing screws, each fixing screw extending through a respective through slot of said plurality of through slots so as to connect said slider and said body.

3. The anchoring device according to claim 1, wherein said fastener portion is provided with at least one lug.

4. The anchoring device, according to claim 1, wherein said fastener portion is comprised of one of a group consisting of: steel sheet, metal sheet, composite sheet, and aluminum.

5. The anchoring device, according to claim 1, wherein said upper tab of the arm of the body is ended with a cone.

6. The anchoring device according to claim 1, wherein said body is comprised of a double-sided side part and an upper part attached to said double-sided part.

7. The anchoring device according to claim 1, wherein said body is comprised of a first side part, a second side part, and another upper part.

8. The anchoring device according to claim 7, further comprising: a fastening pin extending through said another upper part so as to attach said upper tab to said another upper part.

* * * * *